United States Patent
Matsueda et al.

(10) Patent No.: US 11,961,059 B2
(45) Date of Patent: Apr. 16, 2024

(54) INFORMATION PROCESSING SYSTEM, INFORMATION PROCESSING METHOD AND NON-TRANSITORY STORAGE MEDIUM

(71) Applicant: TOYOTA JIDOSHA KABUSHIKI KAISHA, Toyota (JP)

(72) Inventors: Nobuaki Matsueda, Nagoya (JP); Takashi Sueki, Kawagoe (JP); Jun Okamoto, Nagoya (JP); Takumi Wada, Nagoya (JP); Ryo Midorikawa, Nagoya (JP); Junichi Nonaka, Owariasahi (JP); Wataru Shiraishi, Nagoya (JP); Yasuhisa Fujiwara, Miyoshi (JP); Hiroshi Ishikawa, Nagoya (JP); Shigeru Ichikawa, Nagoya (JP); Hidetaka Eguchi, Nagoya (JP); Masayo Nagai, Kariya (JP); Mika Inaba, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 318 days.

(21) Appl. No.: 17/410,161

(22) Filed: Aug. 24, 2021

(65) Prior Publication Data

US 2022/0067682 A1   Mar. 3, 2022

(30) Foreign Application Priority Data

Aug. 26, 2020   (JP) .................................. 2020-142568

(51) Int. Cl.
*G06Q 30/00* (2023.01)
*G06F 16/22* (2019.01)
(Continued)

(52) U.S. Cl.
CPC ......... *G06Q 20/1235* (2013.01); *G06F 16/22* (2019.01); *G06F 16/258* (2019.01);
(Continued)

(58) Field of Classification Search
None
See application file for complete search history.

(56) References Cited

U.S. PATENT DOCUMENTS

| 10,341,309 B1 * | 7/2019 | Ramirez | ................. H04L 67/04 |
| 10,693,649 B2 * | 6/2020 | Wang | .................... H04L 9/3247 |

(Continued)

FOREIGN PATENT DOCUMENTS

| AU | 2017225928 A1 * | 9/2018 | ........... H04L 63/061 |
| CN | 108596693 A * | 9/2018 | ......... G06Q 30/0208 |

(Continued)

OTHER PUBLICATIONS

European Parliament. "Blockchain and the General Data Protection Regulation." (Jul. 2019). Retrieved online Aug. 30, 2023. https://www.europarl.europa.eu/RegData/etudes/STUD/2019/634445/EPRS_STU(2019)634445_EN.pdf (Year: 2019).*

(Continued)

*Primary Examiner* — James A Reagan
(74) *Attorney, Agent, or Firm* — Oblon, McClelland, Maier & Neustadt, L.L.P.

(57) ABSTRACT

The present disclosure promotes distribution of sensor data among a plurality of business operators. A controller that an information processing system according to the present disclosure includes collects first data including a plurality of items and personal information from mobile bodies belonging to a first business operator. The controller converts the first data to second data not being usable to identify individuals. The controller provides data in a range decided based on content of a predetermined data use contract, (Continued)

among the second data, to a second business operator. The controller calculates a consideration for the data that is to be paid by the second business operator, based on a data use record of the second business operator.

5 Claims, 13 Drawing Sheets

(51) Int. Cl.
| | |
|---|---|
| G06F 16/25 | (2019.01) |
| G06F 21/62 | (2013.01) |
| G06Q 20/12 | (2012.01) |
| G06Q 20/14 | (2012.01) |
| G06Q 20/38 | (2012.01) |
| G06Q 30/0201 | (2023.01) |
| H04L 9/08 | (2006.01) |

(52) U.S. Cl.
CPC ....... *G06F 21/6254* (2013.01); *G06Q 20/145* (2013.01); *G06Q 20/3829* (2013.01); *G06Q 20/389* (2013.01); *G06Q 30/0201* (2013.01); *H04L 9/088* (2013.01)

(56) References Cited

U.S. PATENT DOCUMENTS

| | | | |
|---|---|---|---|
| 10,762,052 B2* | 9/2020 | Bailey | G06F 16/176 |
| 11,443,246 B2* | 9/2022 | Gueye | G06Q 50/01 |
| 11,531,661 B2* | 12/2022 | Catalano | G06F 16/487 |
| 11,544,782 B2* | 1/2023 | Cella | G06Q 40/03 |
| 11,556,959 B2* | 1/2023 | Fournier | G06F 16/958 |
| 2012/0303616 A1 | 11/2012 | Abuelsaad et al. | |
| 2013/0297403 A1* | 11/2013 | Manning | G06Q 50/01 |
| | | | 705/14.39 |
| 2014/0372561 A1* | 12/2014 | Hisano | H04L 47/10 |
| | | | 709/217 |
| 2015/0025991 A1* | 1/2015 | Shaw | G06Q 30/0605 |
| | | | 705/26.2 |
| 2016/0210862 A1* | 7/2016 | Hisano | G08G 1/0145 |
| 2017/0232300 A1* | 8/2017 | Tran | G06F 1/163 |
| | | | 434/247 |
| 2017/0358041 A1* | 12/2017 | Forbes, Jr. | G05D 3/12 |
| 2018/0033062 A1* | 2/2018 | Taylor | G06Q 30/0257 |
| 2018/0143995 A1* | 5/2018 | Bailey | G06F 21/6218 |
| 2018/0285996 A1* | 10/2018 | Ma | H04L 9/3297 |
| 2019/0087589 A1* | 3/2019 | Eliazar | G06F 21/6245 |
| 2019/0147188 A1* | 5/2019 | Benaloh | G06F 21/602 |
| | | | 726/26 |
| 2019/0303463 A1* | 10/2019 | Catalano | G06F 16/22 |
| 2019/0378121 A1 | 12/2019 | Marshall et al. | |
| 2019/0378220 A1* | 12/2019 | Ibrahim | G06Q 20/3224 |
| 2020/0058023 A1* | 2/2020 | Travizano | H04L 9/3239 |
| 2020/0202318 A1* | 6/2020 | Rab | H04L 9/0637 |
| 2020/0219188 A1* | 7/2020 | Cella | G06F 18/23 |
| 2020/0294128 A1* | 9/2020 | Cella | H04L 9/3239 |
| 2020/0348662 A1* | 11/2020 | Cella | G05B 23/0286 |
| 2021/0133790 A1* | 5/2021 | Manning | G06Q 30/0238 |
| 2021/0192651 A1* | 6/2021 | Groth | G06N 20/00 |
| 2021/0248514 A1* | 8/2021 | Cella | G06N 20/00 |
| 2021/0319436 A1* | 10/2021 | Ow | G06Q 20/0658 |
| 2021/0342836 A1* | 11/2021 | Cella | H04L 9/3239 |
| 2021/0374784 A1* | 12/2021 | Cooper | G06Q 30/0214 |
| 2021/0374813 A1* | 12/2021 | Cooper | G06Q 30/0214 |
| 2021/0390585 A1* | 12/2021 | Fournier | H04L 9/3247 |
| 2022/0393881 A1* | 12/2022 | Ow | G06Q 20/3678 |
| 2022/0414259 A1* | 12/2022 | Redniss | G06Q 30/0255 |
| 2023/0095123 A1* | 3/2023 | Fournier | G06F 21/6245 |
| | | | 713/176 |
| 2023/0177507 A1* | 6/2023 | Dalton | G06Q 20/4014 |
| | | | 705/64 |

FOREIGN PATENT DOCUMENTS

| | | | | |
|---|---|---|---|---|
| CN | 111160941 | A | * | 5/2020 |
| CN | 112825520 | A | * | 5/2021 ............. H04L 20/06 |
| JP | 2004-21331 | A | | 1/2004 |
| JP | WO 5445722 | B1 | | 3/2014 |
| JP | 2014-241098 | A | | 12/2014 |
| JP | 2015-225446 | A | | 12/2015 |
| JP | 2019-133419 | A | | 8/2019 |
| JP | 111402043 | A | | 7/2020 |
| JP | 2021107968 | A | * | 7/2021 ............. G06Q 50/10 |
| WO | WO-2021041746 | A1 | * | 3/2021 ......... G06F 21/6254 |
| WO | WO-2021243154 | A1 | * | 12/2021 ......... G06Q 30/0201 |
| WO | WO-2022271361 | A1 | * | 12/2022 ......... G06F 21/6245 |

OTHER PUBLICATIONS

Micah Altman et al. "Practical approaches to big data privacy over time." (Mar. 12, 2018). Retrieved online Aug. 30, 2023. https://academic.oup.com/idpl/article/8/1/29/4930711 (Year: 2018).*

Jimmy Brauer et al. "Blockchain's influence on digital marketing." (2020). Retrieved online Aug. 30, 2023. https://www.diva-portal.org/smash/get/diva2:1446822/FULLTEXT01.pdf (Year: 2020).*

* cited by examiner

Fig. 4

FIRST DATABASE

| USER ID | VEHICLE ID | DATE AND TIME INFORMATION | POSITION INFORMATION | DATA PROVIDER |
|---|---|---|---|---|
| U001 | V001 | ... | ... | A COMPANY |
| U001 | V001 | ... | ... | A COMPANY |
| U001 | V001 | ... | ... | A COMPANY |
| U002 | V002 | ... | ... | B COMPANY |

DATA SPECIFIC TO ONBOARD APPARATUSES (SPECIFIC DATA)

DATA OBTAINED BY SENSING (SENSOR DATA)

Fig. 5

SECOND DATABASE

| USER ID | VEHICLE ID | SEX | AGE | OCCUPATION | MARRIED/UNMARRIED | VEHICLE TYPE | DATE AND TIME INFORMATION | POSITION INFORMATION | DATA PROVIDER |
|---|---|---|---|---|---|---|---|---|---|
| 1fb64406e3 9d0906 | f2b25a75d4 7700dd | MALE | 40'S | OFFICE WORKER | MARRIED | ... | ... | (LATITUDE/LONGITUDE) | A COMPANY |
| cca68bbb84 bb9eda | 14d117ecd7 31ca03 | MALE | 30'S | OFFICE WORKER | MARRIED | ... | ... | (LATITUDE/LONGITUDE) | A COMPANY |
| b7360f3f6a 07e61b | 052b91a718 68ff92 | MALE | 20'S | STUDENT | UNMARRIED | ... | ... | (LATITUDE/LONGITUDE) | A COMPANY |
| 491362019d 5c3c62 | af4e441c08 386f13 | MALE | 30'S | PUBLIC WORKER | UNMARRIED | ... | ... | (LATITUDE/LONGITUDE) | B COMPANY |
| ... | ... | ... | ... | ... | ... | ... | ... | ... | ... |

SPECIFIC DATA CONVERTED TO HASH VALUES

ANONYMIZED SPECIFIC DATA

CONTRACT DATA

| BUSINESS OPERATOR | ACCESS-PERMITTED ITEM | FEE CALCULATION CRITERION | UNIT PRICE |
|---|---|---|---|
| C COMPANY | ALL | NUMBER OF QUERIES | ... |
| D COMPANY | DATE AND TIME, POSITION INFORMATION, SEX, AGE, VEHICLE TYPE | DATA TRANSFER AMOUNT | ... |
| E COMPANY | USER ID (HASH VALUE), VEHICLE ID (HASH VALUE), POSITION INFORMATION | NUMBER OF RECORDS | ... |
| F COMPANY | ALL OTHER THAN USER ID AND VEHICLE ID | ... | ... |
| ... | ... | ... | ... |

Fig. 9

RECORD DATA

| BUSINESS OPERATOR | DETAILS OF DATA | AMOUNT |
|---|---|---|
| C COMPANY | (SUMMARY OF USED DATA) | ... |
| D COMPANY | ... | ... |
| E COMPANY | ... | ... |
| ... | ... | ... |

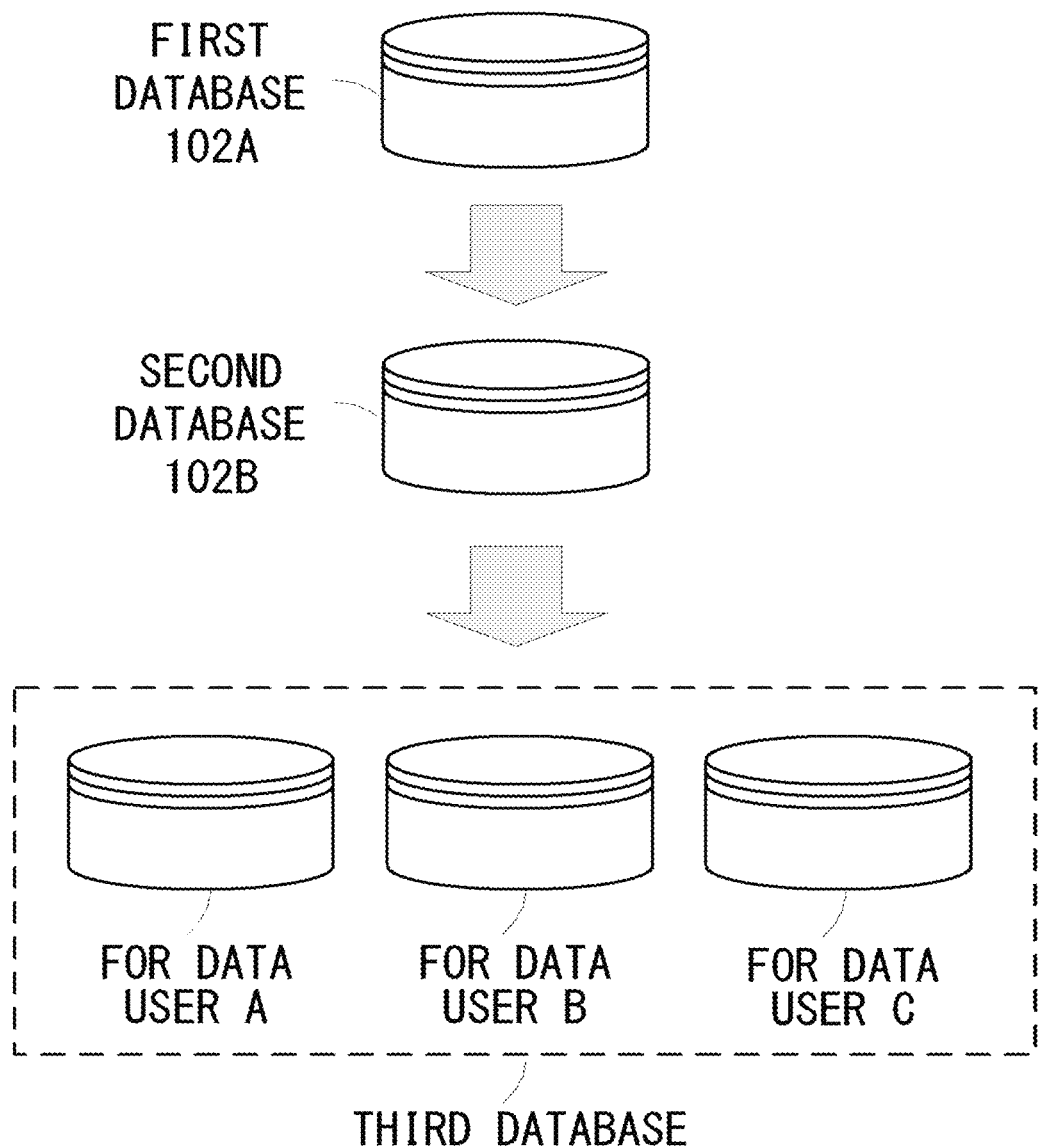

Fig. 11A
CONTRACT DATA (FOR DATA USERS)

| BUSINESS OPERATOR | ACCESS-PERMITTED ITEM | FEE CALCULATION CRITERION | UNIT PRICE |
|---|---|---|---|
| C COMPANY | ALL | NUMBER OF QUERIES | ... |
| D COMPANY | DATE AND TIME, POSITION INFORMATION, SEX, AGE, VEHICLE TYPE | DATA TRANSFER AMOUNT | ... |
| E COMPANY | USER ID (HASH VALUE), VEHICLE ID (HASH VALUE), POSITION INFORMATION | NUMBER OF RECORDS | ... |
| F COMPANY | ALL OTHER THAN USER ID AND VEHICLE ID | ... | ... |
| ... | ... | ... | ... |

Fig. 11B
CONTRACT DATA (FOR DATA PROVIDERS)

| BUSINESS OPERATOR | PROVIDED DATA | FEE CALCULATION CRITERION | UNIT PRICE |
|---|---|---|---|
| G COMPANY | USER ID, VEHICLE ID, POSITION INFORMATION | NUMBER OF RECORDS OF USE | ... |
| H COMPANY | USER ID, VEHICLE ID, POI | NUMBER OF RECORDS OF PROVISION | ... |
| ... | ... | ... | ... |

Fig. 12

RECORD DATA

| BUSINESS OPERATOR | TYPE | DETAILS OF DATA | AMOUNT |
|---|---|---|---|
| C COMPANY | DATA USER | (SUMMARY OF USED DATA) | ... |
| D COMPANY | DATA USER | ... | ... |
| E COMPANY | DATA USER | ... | ... |
| G COMPANY | DATA PROVIDER | (SUMMARY OF PROVIDED DATA) | ... |
| H COMPANY | DATA PROVIDER | ... | ... |
| ... | ... | ... | ... |

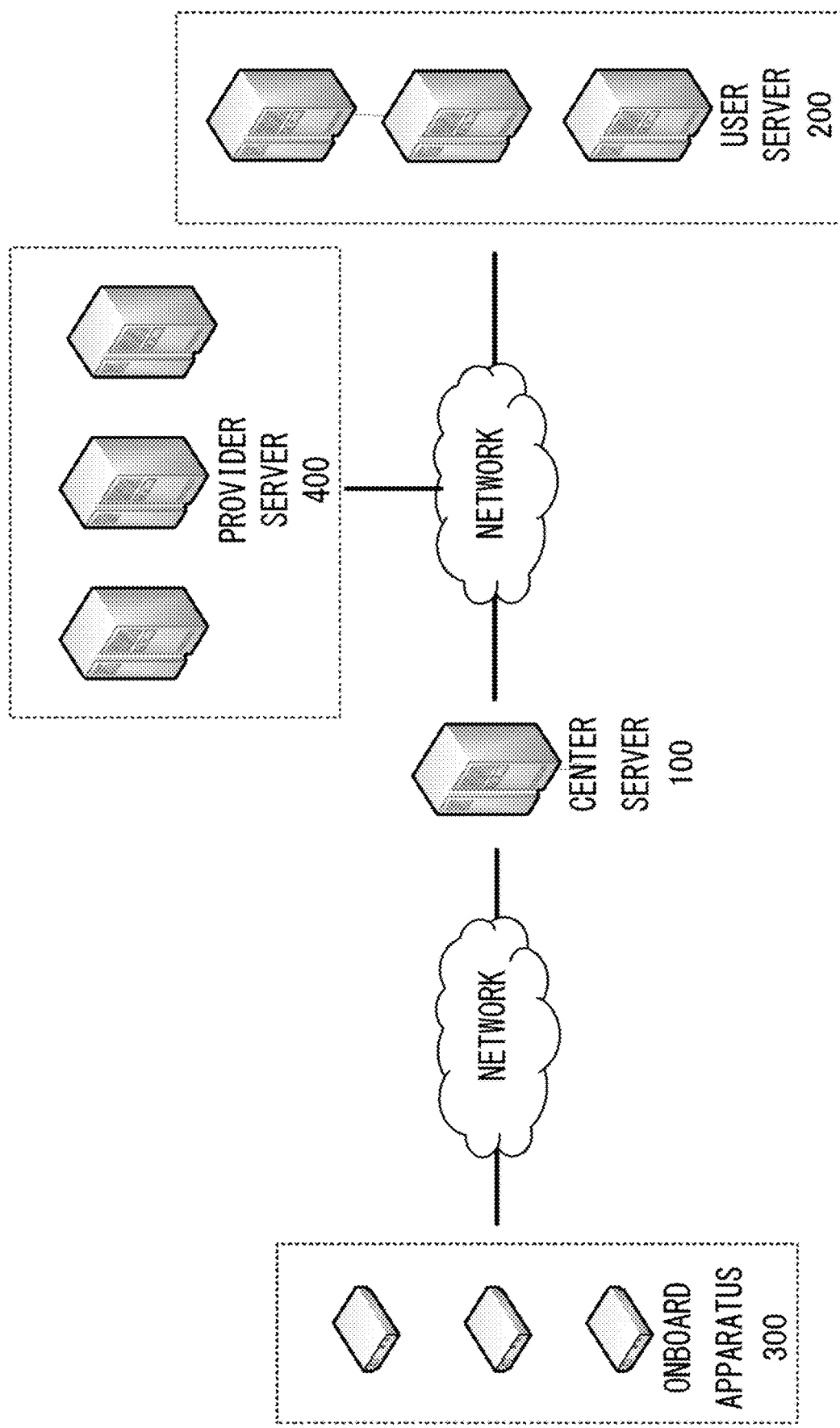

ND NON-TRANSITORY STORAGE
INFORMATION PROCESSING SYSTEM, INFORMATION PROCESSING METHOD AND NON-TRANSITORY STORAGE MEDIUM

CROSS REFERENCE TO THE RELATED APPLICATION

This application claims the benefit of Japanese Patent Application No. 2020-142568, filed on Aug. 26, 2020, which is hereby incorporated by reference herein in its entirety.

BACKGROUND

Technical Field

The present disclosure relates to utilization of sensor data.

Description of the Related Art

Technology called a sensor network has been examined. A sensor network enables collection, management and seamless utilization of sensing data by installing sensor devices including a sensing function and a communication function in various places, mobile bodies, facilities and the like and networking the sensor devices.

For example, data collected by vehicles can be made use of for fields such as marketing. In such a network, a business operator providing data and a business operator using the data are often separate bodies. In connection therewith, for example, in Japanese Patent No. 5445722, a technique for performing matching between a business operator providing data and a business operator needing the data is disclosed.

[Patent document 1] Japanese Patent No. 5445722

SUMMARY

According to a conventional technique, it is possible to combine a business operator providing data (a first business operator) and a business operator using the data (a second business operator).

Meanwhile, in the case of sharing data among different business operators, protection of personal information is a problem. Furthermore, payment of a consideration from the second business operator to the first business operator is required according to a data provision record.

One or more aspects of the present disclosure are directed to promote distribution of sensor data among a plurality of business operators.

A first aspect of the present disclosure may be an information processing system including a controller including at least one processor configured to execute: collecting first data including a plurality of items and personal information from mobile bodies belonging to a first business operator; converting the first data to second data not being usable to identify individuals; providing data in a range decided based on content of a predetermined data use contract, among the second data, to a second business operator; and calculating a consideration for the data that is to be paid by the second business operator, based on a data use record of the second business operator.

A second aspect of the present disclosure may be an information processing system including a controller including at least one processor configured to execute: acquiring data including a plurality of items and personal information collected from mobile bodies belonging to a first business operator; providing data in a range decided based on content of a predetermined data use contract, among the data, to a second business operator; and calculating a consideration for the data that is to be paid by the second business operator, based on a data use record of the second business operator.

A third aspect of the present disclosure may be an information processing method including: collecting first data including a plurality of items and personal information from mobile bodies belonging to a first business operator; converting the first data to second data not being usable to identify individuals; providing data in a range decided based on content of a predetermined data use contract, among the second data, to a second business operator; and calculating a consideration for the data that is to be paid by the second business operator, based on a data use record of the second business operator.

As another aspect, a computer-readable storage medium non-temporarily storing a program for executing the information processing method described above may be given.

According to the present disclosure, it is possible to promote distribution of sensor data among a plurality of business operators.

BRIEF DESCRIPTION OF THE DRAWINGS

FIG. 4 is a diagram illustrating a first database in the first embodiment;

FIG. 5 is a diagram illustrating a second database in the first embodiment;

FIG. 6 is a diagram illustrating contract data in the first embodiment;

FIG. 9 is a diagram illustrating record data in the first embodiment;

FIG. 10 is a diagram illustrating a third database in a modification;

FIGS. 11A and 11B are diagrams illustrating contract data in a second embodiment;

FIG. 12 is a diagram illustrating record data in the second embodiment; and

FIG. 13 is a diagram illustrating an outline of an information processing system according to a third embodiment.

DESCRIPTION OF THE EMBODIMENTS

Figure 1:
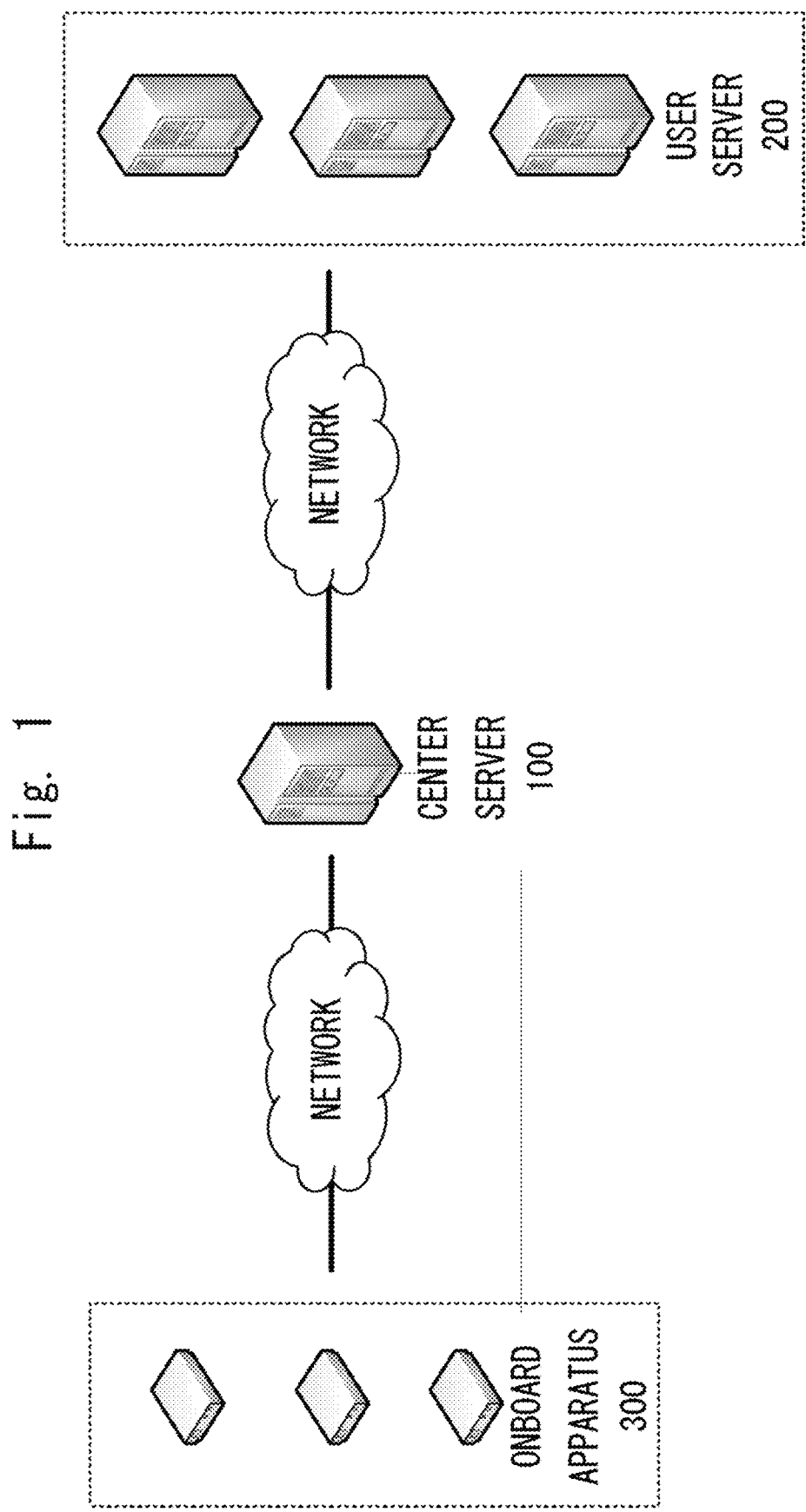
FIG. 1 is a diagram illustrating an outline of an information processing system according to a first embodiment.

A system of acquiring data collected by a plurality of mobile bodies under a first business operator and selling the data to a second business operator that desires the data is conceivable. One of problems in such a system is protection of personal information. For example, it is not desirable to provide information that can identify individuals alone to another business operator that has not concluded a non-disclosure agreement.

Furthermore, for safety of dealing, it is desirable to clarify which data the second business operator can access and how much is to be paid as a consideration for use of the data.

In an information system according to an embodiment, a controller may execute: collecting first data including a plurality of items and personal information from mobile bodies belonging to a first business operator; converting the first data to second data not being usable to identify individuals; providing data in a range decided based on content of a predetermined data use contract, among the second data, to a second business operator; and calculating a consideration for the data that is to be paid by the second business operator, based on a data use record of the second business operator.

The first data may be data associated with mobile bodies or data collected by the mobile bodies. For example, when the mobile bodies are vehicles, the first data can include position information about the vehicles, places the vehicles visited, data sensed by the vehicles and the like. The first data includes personal information, typically, information about owners of the vehicles (for example, identifiers of the individuals), information about the vehicles (for example, vehicle identification numbers and frame numbers) and the like.

The controller may convert the first data to the second data not being usable to identify individuals. The conversion may be performed, for example, by irreversible conversion like hashing or by a process of deleting personal information. Conversion for converting information that can identify individuals to more generalized information is also possible.

Further, the controller decides which range of collected data is to be provided for the second business operator, based on the predetermined data use contract, and calculates the consideration for the data to be provided. The data use contract may be a contract concluded between a system administrator and the second business operator. When there is a plurality of second business operators, there may be a plurality of data use contracts.

According to such a configuration, it is possible to decide data to be provided and a consideration for the data according to content of a contract concluded beforehand.

Further, the controller may perform the conversion by performing at least either a hashing process or an anonymization process for each of the plurality of items included in the first data.

By hashing data, it becomes impossible to identify individuals. Further, by encrypting the data, it is possible to permit only a second business operator that has concluded a contract to use the data. The anonymization process may be the process of deleting information that can identify individuals or may be the process of replacing the information that can identify individuals with generalized information.

Further, the controller may perform the hashing process for an item that can identify individuals alone among the plurality of items.

As such items, there are, for example, identifier of individual, personal number, frame number of vehicle, vehicle identification number (VIN) and the like.

Further, the anonymization process may be a process of replacing an item that can identify individuals alone with superordinately conceptualized data.

For example, identifiers of individuals are collected as data, the identifiers are replaced with sets of sex, age, occupation and the like. Thereby, the information that can identify the individuals can be deleted.

Further, the controller may decide a process to be executed for each of the plurality of items based on an attribute of the item.

Thereby, it becomes possible to respond according to items, such as performing hashing or the anonymization process for an item that can identify individuals alone and performing an encryption process for other items.

Further, the first data may be data including at least position information about the mobile bodies and information about attributes of owners of the mobile bodies.

As the attributes of the owners, for example, age, sex, occupation, income, family structure and the like are given. Such information can be utilized for marketing.

Further, the information processing system may further include a storage configured to store use contract data indicating content of the data use contract.

The use contract data may include information for identifying an item accessible from the second business operator among the second data. When the second data is stored in a database, an access right to the database may be set for each second business operator based on the use contract data.

Further, the controller may generate third data to be provided to the second business operator, from the second data, based on the use contract data.

The third data may be stored in a database corresponding to each of a plurality of second business operators.

Further, the controller may issue a key for decrypting the second data that is encrypted, based on the use contract data.

According to such a configuration, only a second business operator that has concluded a contract can decrypt data.

Further, the use contract data may include data about a calculation criterion of the consideration. Further, the controller may calculate the consideration based on the consideration calculation criterion and the data provided to the second business operator.

The consideration calculation criterion is such that defines how much is to be charged as a consideration for what kind of use of data. The consideration calculation criterion can be at least any of the number of queries, the number of items to be provided, a data transfer amount, and a value of data.

Further, the controller may charge to the second business operator based on the calculated consideration.

Thereby, it is possible to return profit to the first business operator.

Further, a storage configured to store provision contract data indicating content of a data provision contract for the first business operator may be further provided.

The data provision contract is such that defines conditions for the first business operator to provide data. The data provision contract may be such that defines, for example, a consideration for providing data, a consideration to be paid when the data is used, and the like.

Further, when calculating the consideration, the controller may generate record data including at least any of an identifier of the first business operator that receives the consideration, an identifier of the second business operator that pays the consideration, an amount of the consideration, and a used item.

By generating the record data, it is possible to visualize a flow of data and a consideration.

Further, the controller may hold the record data by a block chain using nodes that a plurality of business operators owns.

By holding the record data by a block chain, it is possible to make dealing of data open.

Embodiments of the present disclosure will be described below based on drawings. Configurations of the embodiments below are mere examples, and the present disclosure is not limited to the configurations of the embodiments.

First Embodiment

An outline of an information processing system according to a first embodiment will be described with reference to FIG. 1. The information processing system according to the present embodiment is configured including onboard apparatuses 300 mounted on a plurality of vehicles (connected cars), a center server 100 and user servers 200.

Each onboard apparatus 300 includes a function of collecting data using a sensor and a function of transmitting the collected data to the center server 100. The onboard apparatus 300 belongs to a business operator providing data (the first business operator; hereinafter referred to as a data provider). For example, when the data provider is an auto manufacturer, the onboard apparatus 300 can be an apparatus mounted on an automobile of the manufacturer. There may be a plurality of onboard apparatuses 300 that is included in the system.

The center server 100 is a server apparatus that accumulates and processes data transmitted from the onboard apparatuses 300 and provides the data to business operators that use the data (the second business operators; hereinafter referred to as data users). The center server 100 holds content of a contract concluded between an administrator of the center server 100 and the data provider (a contract about provision of data; hereinafter referred to as a data provision contract) and content of contracts concluded between the administrator of the center server 100 and the data users (contracts about use of data; hereinafter referred to as data use contracts) and can mediate appropriate data delivery based on a contract for each business operator. Further, the center server 100 calculates a consideration accompanying giving and receiving of data and acts for payment between business operators.

Each user server 200 is a server that accesses data acquired by the onboard apparatuses 300 and stored in the center server 100. The user server 200 belongs to a business operator that is a data user. There may be a plurality of user servers 200 that are included in the system.

In the system according to the present embodiment, the onboard apparatuses 300, the center server 100 and the user servers 200 are mutually connected via a network. As the network, for example, a WAN (wide area network), which is a worldwide public communication network such as the Internet, or other communication networks may be adopted. Further, the network may include a telephone communication network for mobile phones or the like, or a wireless communication network such as Wi-Fi (registered trademark).

Figure 2:
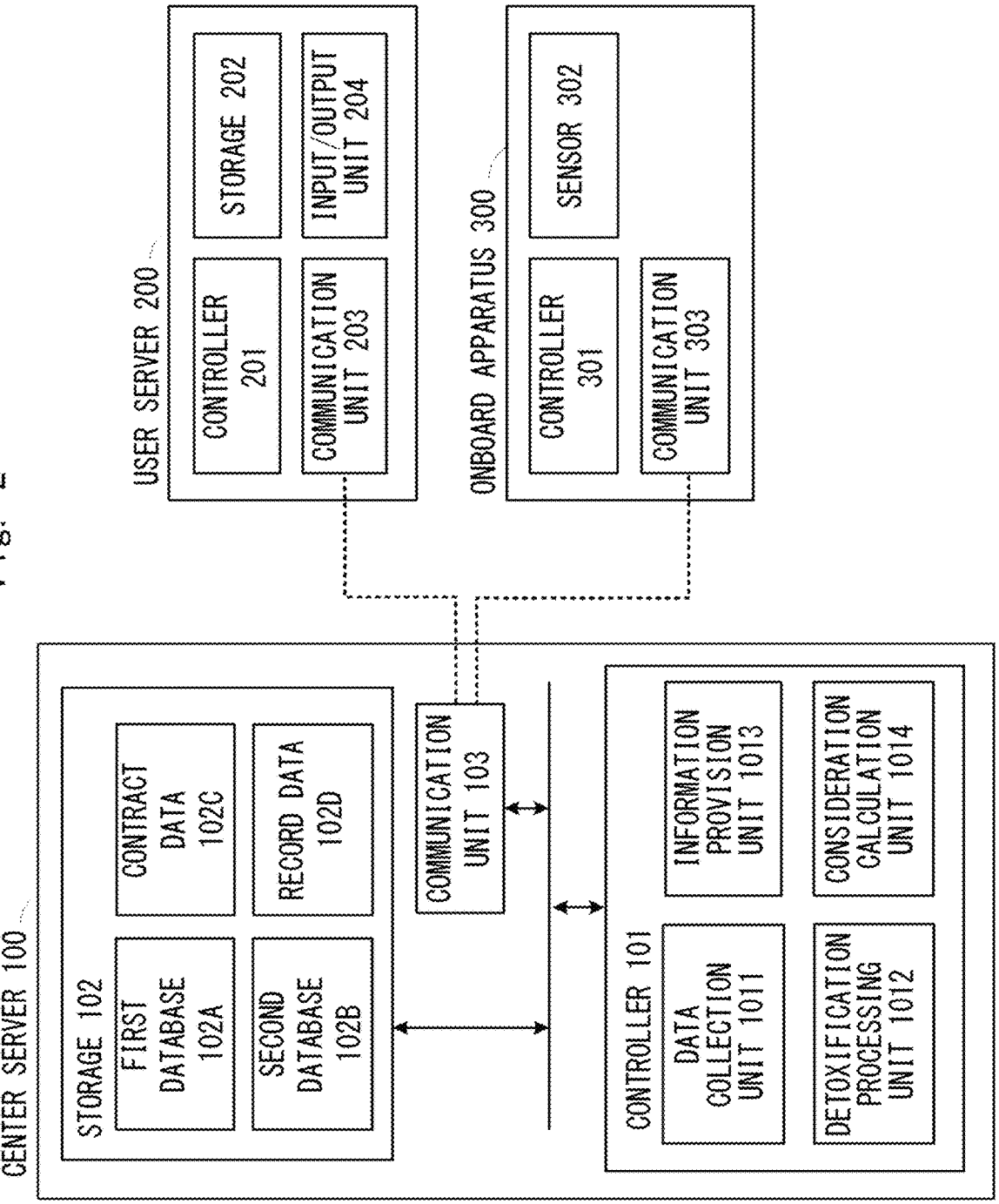
FIG. 2 is a diagram illustrating components of the information processing system according to the first embodiment in detail.

FIG. 2 is a diagram illustrating components of the information processing system according to the present embodiment in more detail. Here, details of each onboard apparatus 300 will be described first.

The onboard apparatus 300 is an onboard computer that collects data using a sensor and transmits the collected data to the center server 100. The onboard apparatus 300 is configured including a controller 301, a sensor 302 and a communication unit 303.

The controller 301 is a microcomputer that is responsible for control performed by the onboard apparatus 300. The controller 301 can be configured, for example, as a one-chip microcomputer in which an arithmetic unit, a main memory and an auxiliary storage device are packaged. A part or all of functions of the controller 301 may be realized by a hardware circuit such as an ASIC or an FPGA.

The controller 301 executes a function of transmitting data collected with the sensor 302 described later (hereinafter, sensor data) and data specific to its own vehicle (hereinafter, specific data) to the center server 100.

The sensor data can include, for example, position information (a latitude and a longitude) about the vehicle, information indicating a place the vehicle is visiting (a point of interest) and the like. The sensor data may be data related to behavior of a driver of the vehicle (hereinafter, a user) such as position information or may be data obtained by sensing a surrounding environment of the vehicle (for example, point cloud data for generating a three-dimensional map, and the like).

The specific data can include, for example, information about the owner of the vehicle (personal attributes and the like), information about the vehicle (a vehicle type, a grade and the like). The specific data may be stored in the onboard apparatus 300 beforehand.

The functions described before may be realized by executing a stored program by a CPU or the like.

The sensor 302 is one or more sensors that collect data about traveling of the vehicle. When collection target data is position information, the sensor 302 may include a GPS module or the like. Further, the sensor 302 may include an image sensor, a distance image sensor, a distance sensor and the like.

The communication unit 303 is a communication interface that connects the onboard apparatus 300 and the center server 100. The communication unit 303 is configured, for example, including a wireless communication module and the like.

Next, details of the center server 100 will be described.

The center server 100 is configured including a controller 101, a storage 102 and a communication unit 103.

The center server 100 can be configured with a general-purpose computer. In other words, the center server 100 can be configured as a computer including a processor such as a CPU and a GPU, a main memory such as a RAM and a ROM, an auxiliary storage device such as an EPROM, a hard disk drive, a removable medium and the like. Note that the removable medium may be a USB memory or a disk storage medium such as a CD and a DVD, for example. The auxiliary storage device stores an operating system (OS), various kinds of programs, various kinds of tables and the like. By loading a program stored therein to a work area of the main memory, executing the program and each of components and the like being controlled through the execution of the program, each of functions that meet predetermined purposes as described later can be realized. However, a part or all of the functions may be realized by a hardware circuit like an ASIC and an FPGA.

The controller 101 is an arithmetic device that is responsible for control performed by the center server 100. The controller 101 can be realized by an arithmetic processing device such as a CPU.

The controller 101 is configured including four function modules of a data collection unit 1011, a detoxification processing unit 1012, an information provision unit 1013 and a consideration calculation unit 1014. Each function module may be realized by executing a stored program by the CPU.

Figure 3:
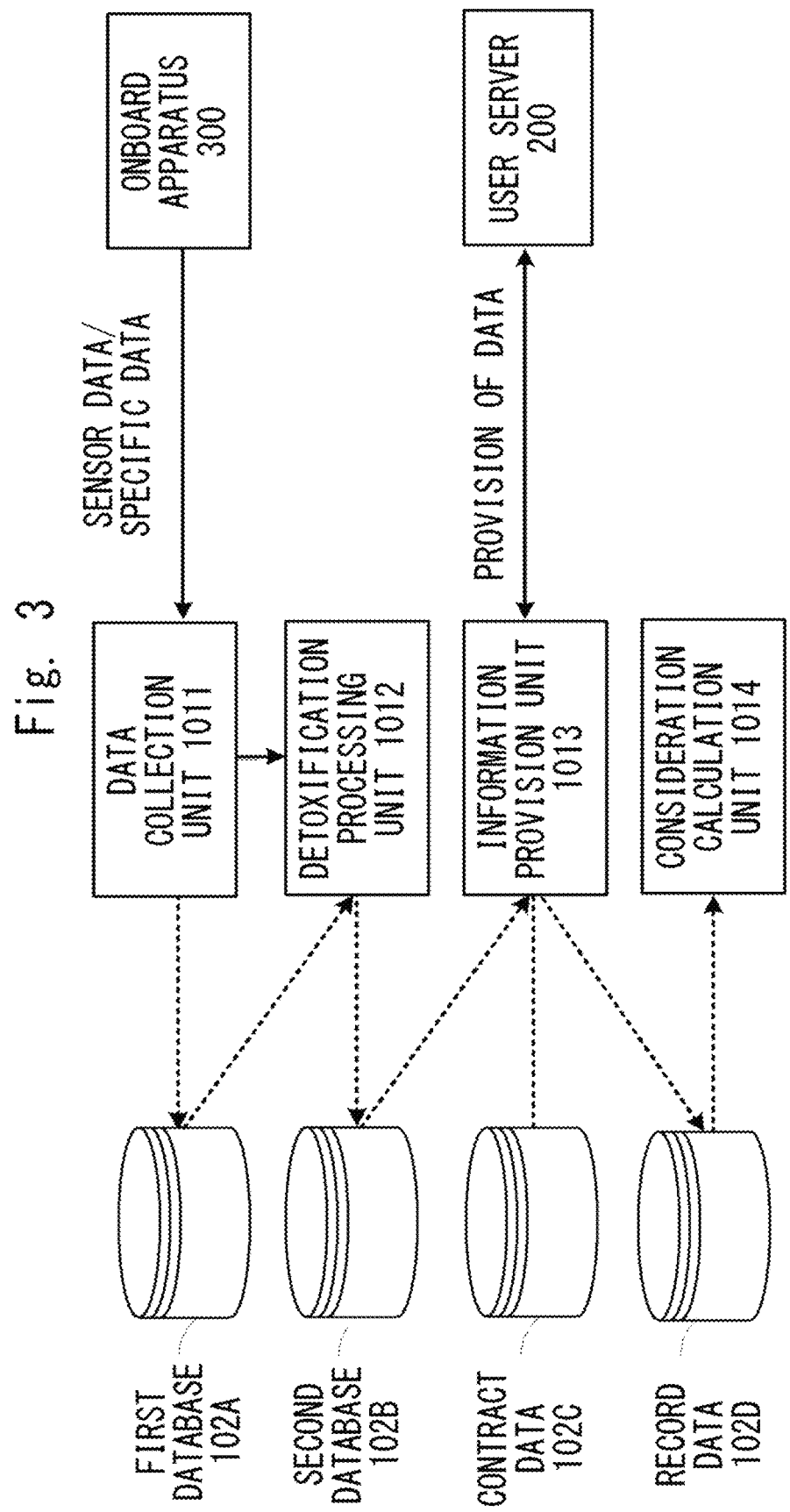
FIG. 3 is a flowchart illustrating a flow of transmitted/received data.

The four function modules will be described with reference to FIG. 3 which is a diagram illustrating data transmitted/received among the modules.

The data collection unit 1011 collects sensor data and specific data transmitted from the onboard apparatuses 300. The collected data is stored into a first database 102A constructed in the storage 102 described later. The first database 102A is a database that stores the data transmitted from the onboard apparatuses 300 without performing processing.

When the data collection unit 1011 ends reception and storage of the data, the process is handed over to the detoxification processing unit 1012.

The detoxification processing unit 1012 converts the data stored in the first database 102A to a form not being usable to identify individuals. The converted data is stored into a second database 102B described later.

Note that, in the description below, a process of deleting information that can identify individuals from the data collected from the onboard apparatuses 300 and a process of converting information that can identify individuals to information that cannot identify individuals will be referred to as "detoxification of data".

The information provision unit 1013 provides access to the second database 102B for a user server 200 in response to a request from the user server 200. The provision of access is performed based on a data use contract concluded between the administrator of the center server 100 and a data user beforehand.

The information provision unit 1013 decides an item that the user server 200 is permitted to access, by referring to data indicating content of a data use contract concluded for each data user (contract data 102C). When the data user uses the second database 102B, a record thereof is stored into the record data 102D.

The consideration calculation unit 1014 calculates a consideration for use of data based on a record of use of data performed by the data user.

The storage 102 is configured including a main memory and an auxiliary storage device. The main memory is a memory where a program executed by the controller 101 and data used by the control program are developed. The auxiliary storage device is a device in which the program executed by the controller 101 and the data used by the control program are stored.

Further, in the storage 102, the first database 102A and second database 102B described before are constructed. Furthermore, the storage 102 stores the contract data 102C and record data 102D.

FIG. 4 illustrates an example of data stored in the first database 102A. In the present example, the first database 102A stores the following items, for example, information identifying owners of vehicles mounted with the onboard apparatuses 300 (user IDs), information identifying the vehicles (vehicle IDs), information indicating dates and time when data was transmitted (date and time information), position information about the onboard apparatuses 300 and information identifying data providers.

Note that the data providers are, for example, manufacturers of the vehicles mounted with the onboard apparatuses 300.

The data stored in the first database 102A includes items that can identify individuals. As the items that can identify individuals, for example, the identifiers of the owners of the vehicles (the user IDs) and the identifiers of the vehicles (the vehicle IDs) are given.

FIG. 5 illustrates an example of the second database 102B. In the present embodiment, the detoxification processing unit 1012 performs a detoxification process for the data stored in the first database 102A and causes the processed data to be stored into the second database 102B. Details of the detoxification process will be described later. A part indicated by reference numeral 501 is detoxified items.

FIG. 6 illustrates an example of the contract data 102C. In the present embodiment, identifiers of business operator that are data users, items the access of which is permitted for the data users, use fee calculation criteria and unit prices are stored in the contract data 102C as indicated in FIG. 6. Note that the contract data 102C may include other items about contracts (for example, information indicating a period during which each contract is effective).

Returning to FIG. 2, description will be continued.

The communication unit 103 is a wireless communication interface for connecting the center server 100 with the onboard apparatuses 300 and the user servers 200. The center server 100 is configured to be capable of communicating with each apparatus, for example, via a wireless LAN or a mobile communication service such as 3G, LTE and 5G.

Returning to FIG. 2, description will be made on the user servers 200 next.

Each user server 200 is an apparatus that a data user manages and is a server apparatus that accesses the center server 100 to acquire data according to a data use contract. Furthermore, the user server 200 is capable of performing processing, analysis and the like of the acquired data. For example, the user server 200 can perform marketing analysis using data such as attributes of owners of vehicles and past position information about the vehicles.

The data user may be, for example, a business operator that operates a store (a retail store, a restaurant or the like) that users visit or may be a business operator related to a vehicle (a car dealer, a repair shop, a car rental operator, a sharing operator or the like). The data user may be a different business operator.

The user server 200 can be also configured with a general-purpose computer similarly to the center server 100. In other words, the user server 200 can be configured as a computer including a processor such as a CPU and a GPU, a main memory such as a RAM and a ROM, an auxiliary storage device such as an EPROM, a hard disk drive, a removable medium and the like.

A controller 201 is an arithmetic device that is responsible for control performed by the user server 200. The controller 201 can be realized by an arithmetic processing device such as a CPU (central processing unit). Each function described later may be realized by executing a program stored in a storage 202 described later by the CPU.

The controller 201 accesses the center server 100 to acquire data. The controller 201 may issue a request (a query) to a database and acquire data returned as a response, for example. Furthermore, the controller 201 may further execute a function of analyzing the acquired data.

The storage 202 is configured including a main memory and an auxiliary storage device. The main memory is a memory where a program executed by the controller 201 and data used by the control program are developed. The auxiliary storage device is a device in which the program executed by the controller 201 and the data used by the program are stored. In the auxiliary storage device, what is obtained by packaging the program executed by the controller 201 as an application may be stored. An operating system for executing such an application may be stored. By a program stored in the auxiliary storage device being loaded to the main memory and executed by the controller 201, a process described hereinafter is performed.

The main memory may include a RAM (random access memory) and a ROM (read-only memory). The auxiliary storage device may include an EPROM (erasable programmable ROM) and an HDD (hard disk drive). Furthermore, the auxiliary storage device may include a removable medium, that is, a portable storage medium. The removable medium may be a USB (universal serial bus) memory or a disk storage medium such as a CD (compact disc) and a DVD (digital versatile disc), for example.

A communication unit 203 is a communication interface similar to the communication unit 103. The communication unit 203 is configured to be capable of communicating with the center server 100 via a wide area network such as the Internet.

An input/output unit 204 is a unit that accepts an input operation performed by the user and presents information to the user. In the present embodiment, the input/output unit 204 is configured with one touch panel. In other words, the input/output unit 204 is configured with a liquid crystal display and control means therefor, and a touch panel and control means therefor. The input/output unit 204 may include an input device such as a keyboard and a pointing device such as a mouse. The user server 200 may be configured to be capable of executing acquisition, analysis and the like of data via the input/output unit 204.

Note that the configuration illustrated in FIG. 2 is a mere example, and all or a part of the illustrated functions may be executed with a dedicatedly designed circuit. Further, storage and execution of the program may be performed by a combination of a main memory and an auxiliary storage device other than the illustrated combination.

Next, details of a process executed by the center server 100 will be described.

Figure 7:
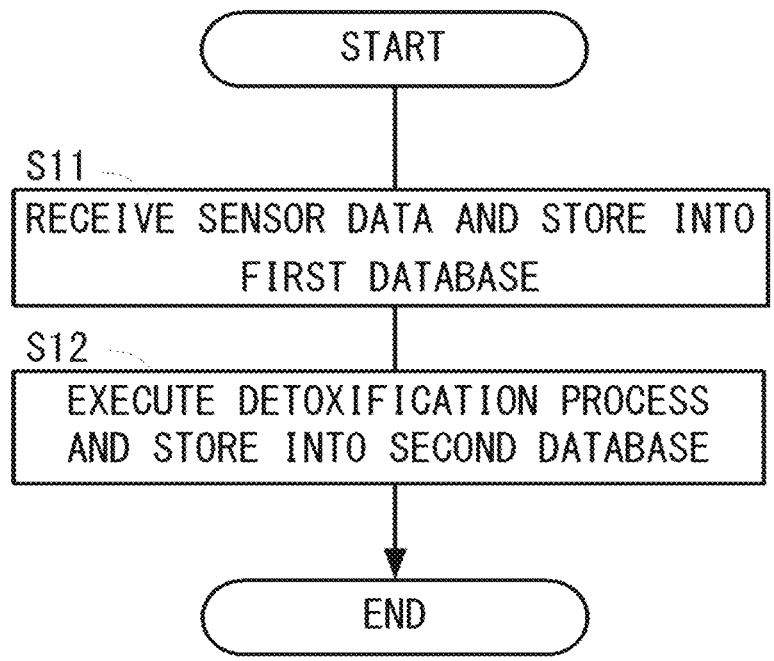
FIG. 7 is a flowchart of a process executed by a center server.

FIG. 7 is a flowchart illustrating a process executed by the center server 100 in the process of collecting data from the onboard apparatuses 300.

First, at step S11, the data collection unit 1011 receives data transmitted from the onboard apparatuses 300 and stores the data into the first database 102A. As described before, the data transmitted from the onboard apparatuses 300 includes data specific to the onboard apparatuses (specific data) and data obtained by sensing (sensor data).

Next, at step S12, the detoxification processing unit 1012 performs the detoxification process for the data stored in the first database 102A. The present step may be executed next to step S11 or may be executed at a predetermined timing.

In the present embodiment, the detoxification process is performed by either a process of hashing the data (a hashing process) or a process of deleting information that can identify individuals from the data (an anonymization process). Furthermore, for the data, a process of encrypting the data (an encryption process) may be executed.

Which process is to be performed for which item among the data stored in the first database 102A can be decided according to rules defined beforehand. For example, it is decided, based on an attribute corresponding to each item, whether the item can identify individuals alone or not; and a predetermined detoxification process may be performed when the item can identify individuals alone.

The hashing process is a process of acquiring hash values of the data using a predetermined rule (a function). Since the hashing process performs irreversible conversion, it becomes impossible to identify individuals or vehicles. Meanwhile, since the same hash values are obtained in the case of the same data, a data user can track a particular user or vehicle while anonymity is maintained.

The anonymization process is a process of replacing an item that can identify individuals alone with an item that cannot identify the individuals alone.

For example, in the case of collecting frame numbers of vehicles as specific data, the vehicles and owners can be identified when the frame numbers themselves are provided outside. Therefore, conversion of superordinately conceptualizing such data, for example, to "vehicle manufacturers and vehicle types" is performed. Thereby, anonymity can be secured. For example, the anonymization process is performed for "users' identifiers" to convert them to sets of data such as "sex", "age", "occupation" and "family structure".

The detoxification-processed data is stored into the second database 102B. FIG. 5 illustrates an example of the second database 102B. In the present example, both of the hashing process and the anonymization process are performed for specific data that can identify individuals.

In this case, by individually setting an access right to the second database 102B, it becomes possible to respond according to business operators, like "providing hashed data for a business operator A and providing anonymized data to a business operator B".

Note that the hashing process and the anonymization process may be combined with the encryption process. In other words, hashed data and anonymized data may be further encrypted. Furthermore, a key for decrypting the encrypted data may be different for each data user. Further, the key may be associated with use contract data.

Figure 8:
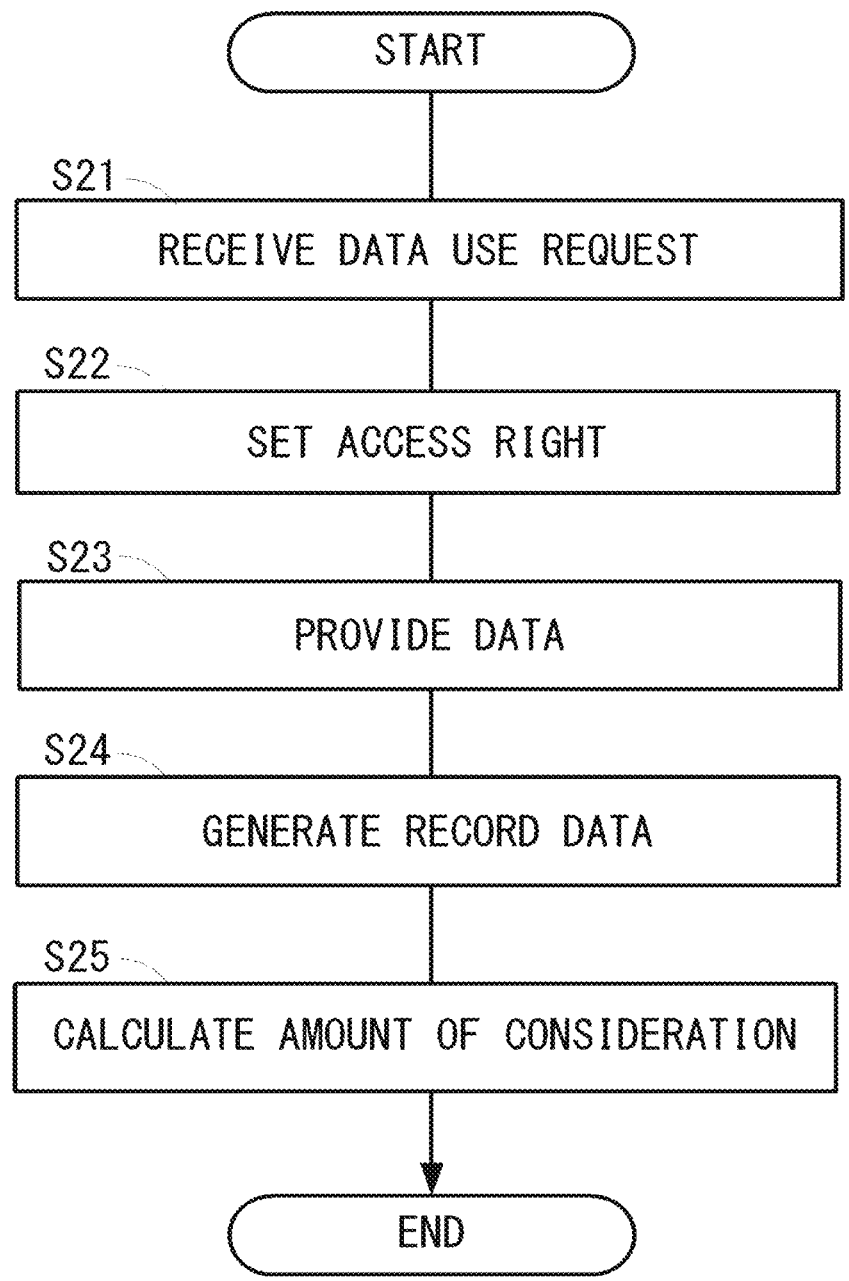
FIG. 8 is a flowchart of a process executed by the center server.

FIG. 8 is a flowchart illustrating a process of the center server 100 providing data to a user server 200 based on a request received from the user server 200.

First, at step S21, the information provision unit 1013 receives a data use request from the user server 200. The data use request is data requesting access to a database (the second database 102B). The data use request may include login information and a query.

At step S22, the information provision unit 1013 refers to the contract data 102C and sets an access right to the database corresponding to the business operator that has transmitted the request. For example, when the data user is E Company in the example of FIG. 6, an access right to three items of hashed user IDs, hashed vehicle IDs and position information is set.

Next, at step S23, the information provision unit 1013 generates a response to the data use request transmitted from the user server 200 and transmits the response to the user server 200. Note that, at this time, the data may be encrypted with a key corresponding to the business operator. The key may be such that is usable as far as a contract is effective. Further, the key may be generated based on the contract data 102C.

When the provision of the data ends, the information provision unit 1013 causes a data use record to be reflected on the record data 102D.

FIG. 9 illustrates an example of the record data 102D. As illustrated, the data use record may include identifiers of business operators that are data users, outlines (or details) of data used by the data users, and the like.

At step S25, the consideration calculation unit 1014 calculates an amount of a consideration based on the record data 102D. The amount can be calculated, for example, multiplying a numerical value corresponding to a data provision record (for example, a total amount of transferred data) by a unit price recorded in the contract data 102C. The consideration calculation unit 1014 adds the calculated amount to the record data 102D.

Note that the center server 100 may execute a process of charging to the data user based on the generated record data 102D. Charging may be a billing process or may be a process of subtracting from the prepaid balance paid in advance.

Though the unit price is uniform in the present example, the unit price may be fluctuated based on a value of used data (an item). A unit price for each item may be included in the contract data 102C.

As described above, in the information processing system according to the first embodiment, a process for protecting personal information is performed for data collected from the plurality of onboard apparatuses 300, and provision of the data is performed to an arbitrary business operator based on content of a contract concluded beforehand. Thereby, it is possible to promote distribution of data among a plurality of business operators.

Modification of First Embodiment

Though an access right to the second database 102B is set based on the contract data 102C in the first embodiment, independent databases (third databases) that a plurality of data users can access, respectively, may be constructed. For example, as indicated in FIG. 10, a plurality of tables corresponding to a plurality of data users may be generated based on the second database 102B. Each table can be a table in which only items that a corresponding data user can access are stored.

Further, though the center server 100 provides only data extracted from the database to each user server 200 in the first embodiment, the center server 100 may provide a service of performing a predetermined process for the extracted data. For example, the center server 100 may perform a process of analyzing data (for example, a process of taking statistics), a process of processing data (for example, a process of visualizing data) or the like and provide a processing result to the user server 200.

Second Embodiment

In the first embodiment, a consideration for data is calculated according to a record of a data user having used the data. A second embodiment is an embodiment in which, in addition thereto, a consideration that a data provider receives is further calculated.

In the second embodiment, both of contract data 102C for data users (use contract data) and contract data for data providers (provision contract data) are held as the contract data 102C. FIGS. 11A and 11B illustrate examples of the contract data in the second embodiment.

As illustrated, kinds of data to be provided and consideration calculation criteria are recorded in the contract data for data providers. As the consideration calculation criteria, there are, for example, "a consideration is paid according to the number of records of provided data", "a consideration is paid according to the number of records of data used by the data user" and the like.

FIG. 12 illustrates an example of the record data 102D in the second embodiment. The record data 102D in the second embodiment is obtained by adding records of data providers to the record data 102D in the first embodiment. A record of a data provider may be generated at step S24 or may be generated at a stage of the data provider providing data, that is, at step S11.

In the second embodiment, it is possible to decide an amount charged for a data user and decide an amount returned to a data provider. According to such an embodiment, it becomes possible to mediate delivery of a consideration between a data user and a data provider.

Third Embodiment

Though the record data 102D is held by the center server 100 in the first and second embodiments, the record data 102D may be shared among a plurality of nodes by distributed computing.

In a third embodiment, in addition to the user servers 200, provider servers 400, which are server apparatuses managed by data providers, are connected to the network. FIG. 13 is a configuration diagram of a system according to the third embodiment.

In the third embodiment, instead of the center server 100 storing the record data 102D, the record data 102D is held by all the nodes participating in the system.

In the third embodiment, each of the center server 100, all the user servers 200 and all the provider servers 400 holds a record database, and, when record data 102D newly occurs, updates the database using a block chain.

According to such a configuration, it becomes possible for all the participants in the system can grasp all records (content of data and amounts) that have occurred in the system. Thereby, it is possible to make dealing of data open.

Modification

The above embodiments are mere examples, and the present disclosure can be appropriately changed and implemented within a range not departing from its spirit.

For example, the processes and means described in the present disclosure can be freely combined and implemented as far as technical contradiction does not occur.

Further, a process described as being performed by one apparatus may be shared and executed by a plurality of apparatuses. Or alternatively, processes described as being performed by different apparatuses may be executed by one apparatus. In a computer system, what hardware configuration (server configuration) each function is realized by can be flexibly changed.

The present disclosure can be realized by supplying a computer program in which the functions described in the above embodiments are implemented to a computer, and one or more processors that the computer includes reading out and executing the program. Such a computer program may be provided to the computer by a non-transitory computer-readable storage medium connectable to a system bus of the computer or may be provided to the computer via a network. The non-transitory computer-readable storage medium includes, for example, a disk of an arbitrary type such as a magnetic disk (a floppy (R) disk, a hard disk drive (HDD) and the like), an optical disk (a CD-ROM, a DVD disc, a Blu-ray disc and the like), and a read-only memory (ROM), a random access memory (RAM), an EPROM, an EEPROM, a magnetic card, a flash memory, an optical card, and a medium of an arbitrary type that is appropriate for storing electronic commands.

What is claimed is:

1. An information processing system comprising:
    onboard apparatuses mounted on a plurality of mobile bodies belonging to a first business operator;
    a center server; and
    a user server managed by a second business operator being a data user, wherein the onboard apparatuses are configured to execute:
        collecting sensor data including position information about the mobile bodies collected by sensors included in the mobile bodies; and
        transmitting, to the center server, first data including a plurality of items which includes at least personal information and the collected sensor data, the personal information being about attributes of owners of the mobile bodies,
    the user server is configured to execute transmitting, to the center server, a data use request requesting use of second data converted from the first data, the second data being data that is not usable to identify individuals, the center server includes a storage and a controller connected to the storage, the storage stores a database storing the second data, use contract data, and record data, the use contract data indicating content of a data use contract and including information for identifying an item accessible from the user server among the second data and including data about a calculation criterion of a consideration to be paid by the second business operator for a data use record of the second data based on a data use record of the second business operator, the record data indicating a record of data used by data users and including at least any of an identifier of the first business operator that receives the consideration, an identifier of the second business operator that pays the consideration, an amount of the consideration, and a used item, and the controller includes at least one processor configured to execute:

receiving the first data from the onboard apparatuses;

determining whether or not an attribute corresponding to each of the plurality of items included in the received first data can identify individuals on the corresponding attribute itself by being at least any of an identifier of an individual, a personal number, a frame number of a vehicle, and a vehicle identification number;

converting the first data to the second data by performing a hashing process for each of the plurality of items corresponding to the attribute determined to be the any of the identifier of the individual, the personal number, the frame number of the vehicle, and the vehicle identification number;

storing the converted second data into the database;

receiving the transmitted data use request from the user server;

referring to the use contract data stored in the storage;

setting an access right of the second business operator for the database about data in a range decided based on the content of the data use contract, among the second data;

generating a response to the received data use request;

providing the data in the decided range by transmitting the generated response to the user server;

reflecting a data use record of the provided data for the second business operator on the record data;

calculating a consideration for a use record of the second data that is to be paid by the second business operator based on the calculation criterion of the consideration included in the stored use contract data and the stored record data of the second business operator;

reflecting the calculated consideration in the record data; and charging the second business operator the calculated consideration by a billing process.

2. The information processing system according to claim 1, wherein the storage further stores provision contract data indicating content of a data provision contract for the first business operator.

3. The information processing system according to claim 1, wherein the controller is configured to hold the record data by a block chain using nodes that a plurality of business operators owns.

4. An information processing method executed by a computer, the method comprising:

receiving, from onboard apparatuses mounted on a plurality of mobile bodies belonging to a first business operator, first data including a plurality of items which includes at least personal information and sensor data, the personal information being about attributes of owners of the mobile bodies and the second data being collected by sensors included in the mobile bodies and including position information about the mobile bodies;

determining whether or not an attribute corresponding to each of the plurality of items included in the received first data can identify individuals on the corresponding attribute itself by being at least any of an identifier of an individual, a personal number, a frame number of a vehicle, and a vehicle identification number;

converting the first data to second data that is not usable to identify individuals by performing a hashing process for each of the plurality of items corresponding to the attribute determined to be the any of the identifier of the individual, the personal number, the frame number of the vehicle, and the vehicle identification number;

storing the converted second data into a database stored in the computer;

receiving a data use request requesting use of the second data from a user server which is managed by a second business operator being a data user;

referring to a use contract data stored in the storage, the use contract data indicating content of a data use contract and including information for identifying an item accessible from the user server among the second data and including data about a calculation criterion of a consideration to be paid by the second business operator for a data use record of the second data based on a data use record of the second business operator;

setting an access right of the second business operator for the database about data in a range decided based on the content of a the data use contract, among the second data;

generating a response to the received data use request;

providing the data in the decided range by transmitting the generated response to the user server;

reflecting a data use record of the provided data for the second business operator on a record data stored in the storage, the record data indicating a record of data used by data users and including at least any of an identifier of the first business operator that receives the consideration, an identifier of the second business operator that pays the consideration, an amount of the consideration, and a used item;

calculating a consideration for a use record of the second data that is to be paid by the second business operator based on the calculation criterion of the consideration included in the stored use contract data and the stored record data of the second business operator;

reflecting the calculated consideration in the record data; and charging the second business operator the calculated consideration by a billing process.

5. A non-transitory storage medium storing a program for causing a computer to execute the information processing method according to claim 4.

* * * * *